US008747538B2

(12) United States Patent
Hsiao

(10) Patent No.: US 8,747,538 B2
(45) Date of Patent: Jun. 10, 2014

(54) PHOTOVOLTAIC INGOT MOLD RELEASE

(76) Inventor: Chung-Hou Tony Hsiao, Irvine, CA (US)

( * ) Notice: Subject to any disclaimer, the term of this patent is extended or adjusted under 35 U.S.C. 154(b) by 412 days.

(21) Appl. No.: 13/237,384

(22) Filed: Sep. 20, 2011

(65) Prior Publication Data

US 2013/0068925 A1 Mar. 21, 2013

(51) Int. Cl.

| | |
|---|---|
| ***B28B 7/38*** | (2006.01) |
| ***B28B 7/34*** | (2006.01) |
| ***B28B 7/36*** | (2006.01) |
| ***C09D 1/00*** | (2006.01) |
| ***B29C 33/60*** | (2006.01) |

(52) U.S. Cl.

USPC .................... 106/38.22; 106/38.2; 106/38.27; 249/115; 264/482; 264/497; 427/133; 427/508

(58) Field of Classification Search

USPC ................... 106/38.2, 38.22, 38.27; 249/115; 264/482, 497; 427/133, 508

See application file for complete search history.

(56) References Cited

U.S. PATENT DOCUMENTS

| | | | | |
|---|---|---|---|---|
| 6,165,425 | A * | 12/2000 | Lange et al. | 422/243 |
| 7,540,919 | B2 * | 6/2009 | Parthasarathy et al. | 117/95 |
| 8,012,252 | B2 * | 9/2011 | Engler et al. | 106/38.2 |
| 2007/0013098 | A1 * | 1/2007 | Schwertfeger et al. | 264/131 |
| 2009/0119882 | A1 * | 5/2009 | Uibel | 23/295 R |
| 2009/0277377 | A1 * | 11/2009 | Ohashi et al. | 117/206 |
| 2010/0237225 | A1 * | 9/2010 | Gotoh et al. | 249/115 |
| 2011/0021031 | A1 * | 1/2011 | Taylor et al. | 438/724 |

FOREIGN PATENT DOCUMENTS

| | | | | |
|---|---|---|---|---|
| JP | 9-175809 | A | * | 7/1997 |
| JP | 2004018369 | A | * | 1/2004 |
| JP | 2005161359 | A | * | 6/2005 |
| WO | WO2007/039310 | A1 | * | 4/2007 |

* cited by examiner

*Primary Examiner* — Anthony J Green

(74) *Attorney, Agent, or Firm* — Clement Cheng

(57) ABSTRACT

A photovoltaic crucible mold release compound includes a powder mixture comprising silicon nitride powder having 1 ppm of impurities or less and silicon dioxide 1 ppm of impurities or less mixed in with the silicon nitride powder until the gray of the silicon nitride powder turns lighter in color which is from 1% silicon dioxide in weight up to 50% silicon dioxide in weight. Also included is a binder having a liquid. The powder mixture is mixed with the binder. The binder can be ethanol, water or alcohol. A photovoltaic crucible mold release compound can also include a photovoltaic crucible mold, so that the mold release compound is applied to an inside surface of the photovoltaic crucible mold to a thickness of 75 to 1500 microns.

8 Claims, 3 Drawing Sheets

PHOTOVOLTAIC INGOT MOLD RELEASE

FIELD OF THE INVENTION

The present invention is in the field of silicon nitride based mold release formula

DISCUSSION OF RELATED ART

Silicon nitride has been used in ingot mold making. In United States patent publication 2010/0237225 published Sep. 23, 2010 by first inventor Gotoh, the disclosure of which is incorporated herein by reference, the method for forming a mold includes a silicon nitride powder and binder solution.

Schwertfeger in US 2007/0013098 describes the process of sintering the silicon nitride powder and binder solution to the mold using a laser robot published Jan. 18, 2007, the disclosure of which is incorporated herein by reference. It appears that one method for laser sintering would be described in the patent publication as, "The crucible was irradiated with a radiation power of 3 kW by means of an ABB robot (IRB 2400 model) under the focus of a CO.sub.2 laser (TLF 3000 Turbo model)." The laser robot can be adjusted to provide sintering within an optimal range according to the teaching of U.S. Pat. No. 4,379,111 issued Apr. 5, 1983 to Greskovich, the disclosure of which is incorporated herein by reference. Greskovich teaches use of sintering with a nitrogen inert gas under high-temperature and heat.

Engler in US 2007/0089642 published Apr. 26, 2007 describes a durable hard coating containing silicon nitride and the problems related to adhesion to mold walls. The disclosure of which is incorporated herein by reference. It is interesting to note that the Eng reference describes other prior art, "DE 103 26 769 B3 describes durable boron nitride mould release layers for the pressure casting of nonferrous metals and also slips for producing them, with refractory nanosize binders being used as binder phase for boron nitride. In particular, suspensions of SiO.sub.2-based sol-gel binder and boron nitride powder are applied to metal surfaces or inorganic non-metal surfaces and the coatings obtained in this way are dried and thermally densified. At temperatures above 500.degree. C., the binder system is converted into a vitreous matrix which gives the dense ceramic layer formed mechanical stability. However, these layers containing boron nitride cannot be used in the field of solar silicon, since boron nitride is undesirable as impurity in solar silicon.

DE 103 26 815 A1 describes a substrate having an anti-adhesive coating which is obtainable by applying a coating composition to a substrate and hardening, with the coating composition comprising a) solid particles of a release agent with the exception of boron nitride and b) a binder comprising surface-modified nanosize solid particles. The release agent particles are selected from among graphite, graphite compounds, metal sulphides, metal selenides and metal tellurides. These coatings, too, are not suitable for use in conjunction with solar silicon since the release agents mentioned there, e.g. graphite or metal sulphides, selenides and tellurides, are undesirable as impurities in solar silicon."

Parthasarathy in U.S. Pat. No. 7,540,919 issued Jun. 2, 2009, describes solidification of crystalline silicon from reusable crucible molds and describes a wide range of prior art related to silicon nitride on a silica crucible.

"Other prior art describes the usage of silicon nitride on a silica crucible. There is also prior art that describes a silicon nitride coating process on a silica crucible. Another piece of prior art discloses a CVD coated silicon carbide for growing silicon crystals by a pulling process. Yet other prior art demonstrates the usage of hard coating of zirconates for silicon crystallization.

The use of silicon nitride coating alone has deleterious effects since the layer itself will decompose at higher temperatures, thus introducing nitrogen into the silicon melt. Secondly, since the coating is so porous it will allow the silicon melt to come in contact with the crucible walls, which are made out of silica, thereby drawing impurities from the crucible wall. In using a silica crucible, oxygen is introduced into the silicon melt by the reaction of silicon with the silica surface. Too much oxygen is not encouraged for the production of solar cells, while oxygen is needed for the fabrication of integrated devices.

Rudiger et al. (J. Electrochem. Soc. Vol. 142, 1995) have reported on the reaction of molten silicon with silicon nitride and other refractory materials. The studies clearly show that when silicon is melted in silicon nitride-coated crucibles, the silicon melt does not wet the silicon nitride for the first 20 minutes. At longer reaction times, the melt creeps through the silicon nitride coating.

Though silicon nitride and silicon oxynitride are used as coatings in large scale as crystal growth processes, as claimed by Prakash et al. (J. Cryst. Growth 144 (1994) 41), these coatings alone are not effective to achieve chemical purities for device application. The search for new coating technologies continues to receive significant attention. In order to prevent the silicon melt from coming in direct contact with the silicon nitride, researchers have also reported the use of molten salts with non-wetting characteristics.

The use of graphite as an alternative to quartz was widely attempted. Ciszek et al. in their article in IBM J. Res. Dev. have illustrated a process of growing solar grade silicon by directional solidification in carbon crucibles. Here, the graphite crucible is a sacrificial crucible, i.e. one crucible yields one run, because of the adhesion of the silicon to the crucible walls. A Ukrainian research group has also demonstrated a carbon-carbon crucible for silicon solidification.

Saito et al. (Solar Energy Materials, Vol. 9, 1983) developed a SiC coated carbon or sintered silicon nitride reusable mold with a coating of silicon nitride as the mold release agent. A CVD coated silicon carbide on a graphite mold in combination with silicon nitride coating as mold release for growing silicon crystals is also described in the prior art."

Unfortunately, the state of the art mold release formula leads to excess contamination of the ingot leading to degraded final electrical properties.

SUMMARY OF THE INVENTION

A photovoltaic crucible mold release compound includes a powder mixture comprising silicon nitride powder having 1 ppm of impurities or less and silicon dioxide 1 ppm of impurities or less mixed in with the silicon nitride powder until the gray of the silicon nitride powder turns lighter in color which is from 1% silicon dioxide in weight up to 50% silicon dioxide in weight. Also included is a binder having a liquid. The powder mixture is mixed with the binder. The binder can be ethanol, water or alcohol. A photovoltaic crucible mold release compound can also include a photovoltaic crucible mold, so that the mold release compound is applied to an inside surface of the photovoltaic crucible mold to a thickness of 75 to 1500 microns.

The mold release compound is sintered to inside surface by laser. The mold release compound can be sintered to the inside surface by oven heat and by laser.

Figure 1:
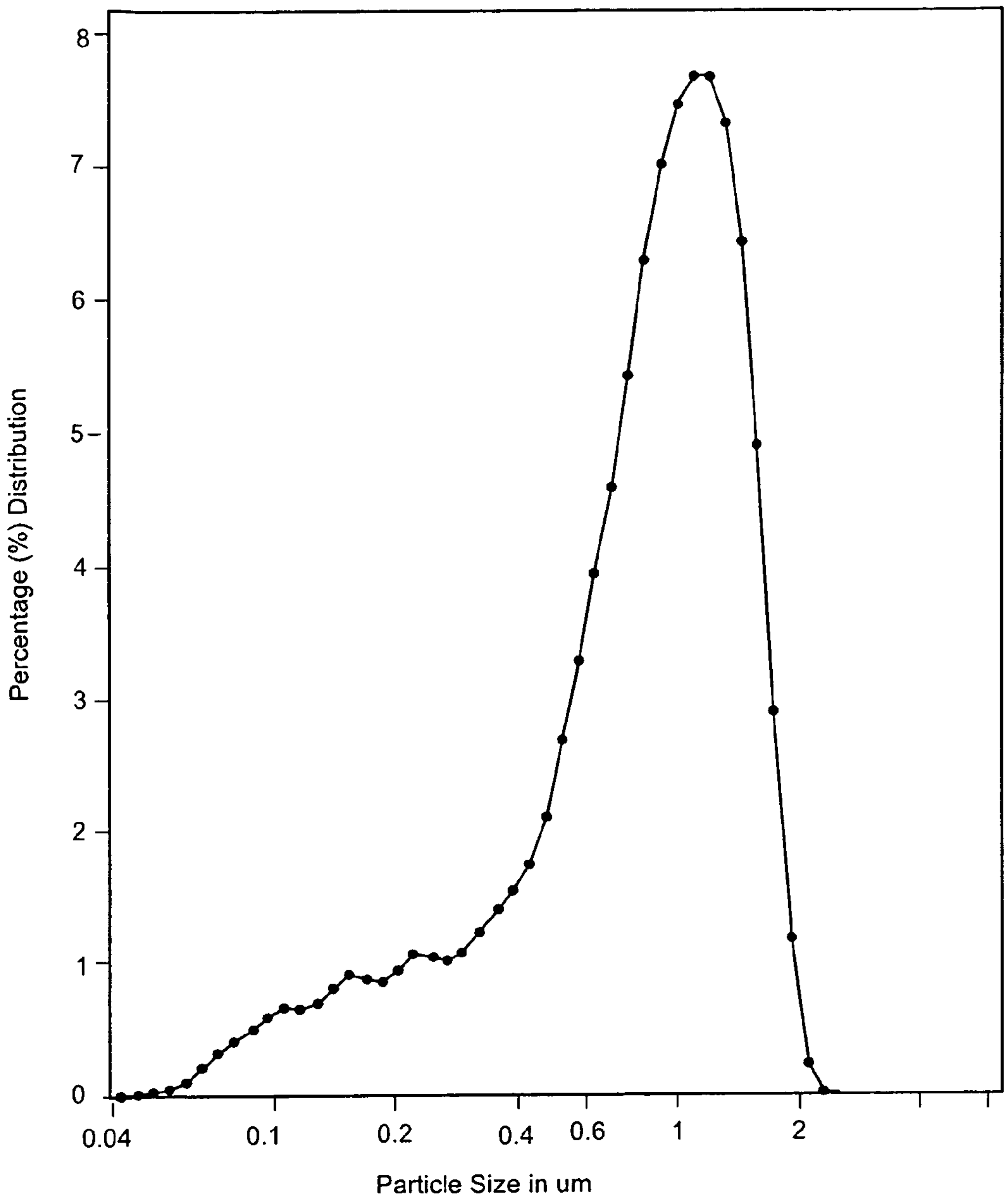
FIG. 1 is a chart of the distribution of the silicon nitride particle size on the horizontal axis in comparison to total percentage of volume on a vertical axis.
Figure 2:
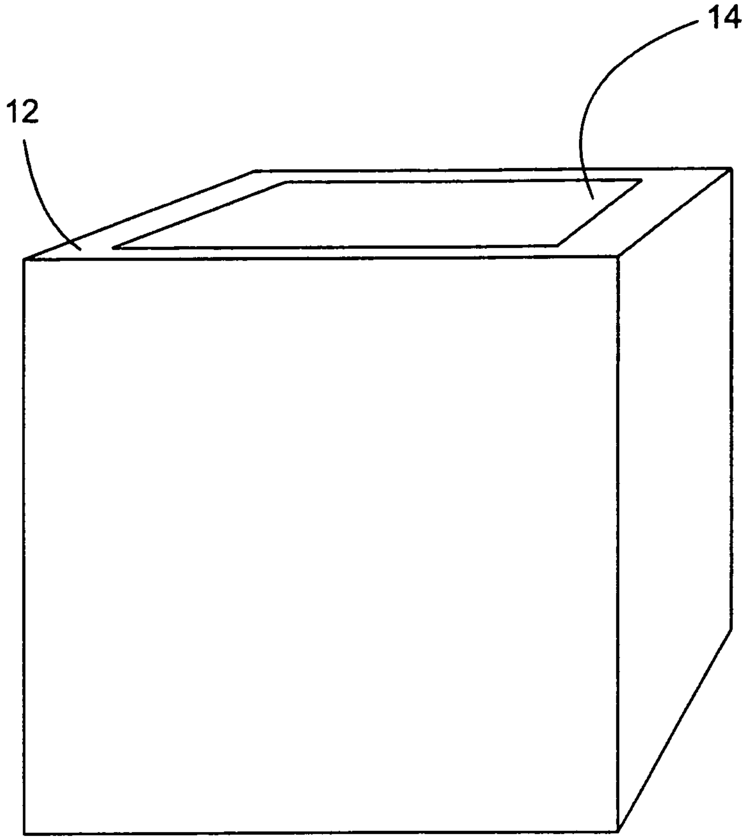
FIG. 2 is a diagram of the mold.
Figure 3:
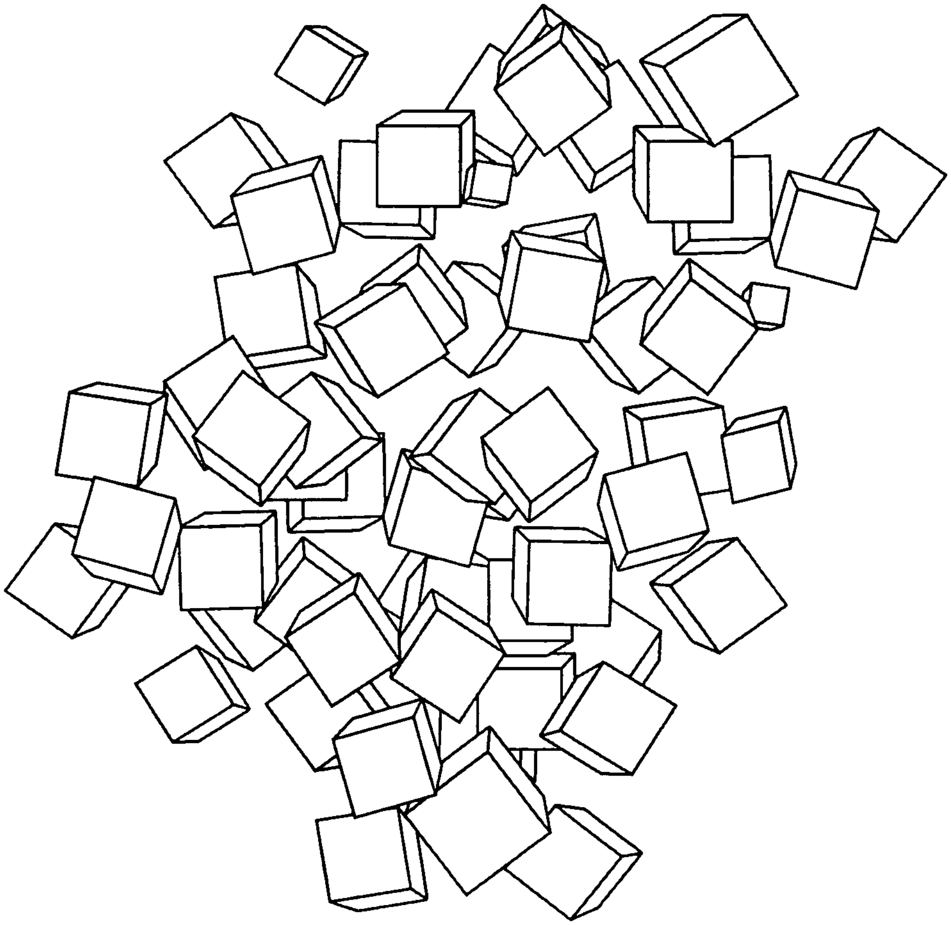
FIG. 3 is a view of the silicon nitride powder particles.

The following call out list of elements references the elements of the drawings.

12 mold wall

14 inside surface of mold wall

DETAILED DESCRIPTION OF THE PREFERRED EMBODIMENT

The mold release formula is made with 1 ppm impurities to 10 ppm impurities silicon nitride powder mix. The best mode silicon nitride powder mix is about 1 ppm of silicon nitride powder formed with average particle size 0.6-0.8 um with triagonal or alpha crystal form $Si_3N_4$. This leads to a specific surface area of 11 $m^2/g$. Generally the purity of the silicon nitride powder mix should be 99.99% with chemical impurities percentage by weight of Cu: <0.0001; Fe: 0.0001; Cr: 0.0001; Ni: 0.0002; Co: <0.0001; Zn: 0.0001; Al: 0.0002; Mg: 0.0001; Ca: - - - ; V: 0.0001; Na: <0.0001; W: <0.0001. The primary distribution of particle size preferably is a median of 1 μm. Silicon dioxide has a similar particle size distribution having from less than 1 ppm impurities to 10 ppm impurities and is mixed with the silicon nitride powder mix until the mix of change color from light gray to white. The solid mixture containing the silicon nitride powder and silicon dioxide mixture is then mixed with a liquid binder such as ethanol or water. The solid mixture is suspended in water or alcohol slurry as a binder solution.

The silicon nitride powder of less than 2 ppm is mixed with the silicon dioxide powder of less than 2 ppm up to equal quantities by weight at which time the color of the powder mixture changes color from a light gray to white.

The mold 12 has an inside surface of the mold wall 14. The mold release formula is applied to the inside surface of the mold wall by spray painting or by brush. It can be cured by drawing and can be sintered. The silicon nitride powder is preferably of a regular shape and not spherical. Any clumps of silicon nitride powder are broken down before mixing with a binder solution.

The mold has an inner space for storing a silicon melt. The inner space is rectangular and appears generally like a cube.

Silicon material can be placed within the mold and heated so that the silicon material changes shape.

Sintering the silicon nitride can be by laser or oven heat. The silicon nitride powder mix can be suspended in ethanol.

The invention claimed is:

1. A photovoltaic crucible mold release compound and photovoltaic crucible mold comprising: a powder mixture comprising silicon nitride powder having 1 ppm impurities or less; and silicon dioxide 1 ppm impurities or less mixed in with the silicon nitride powder until a gray of the silicon nitride powder turns lighter in color which is from 1% silicon dioxide in weight up to 50% silicon dioxide in weight; a binder comprising a liquid, wherein the powder mixture is mixed with the binder, and, further comprising the photovoltaic crucible mold, wherein the mold release compound is applied to an inside surface of the photovoltaic crucible mold to a thickness of 75 to 1500 microns.

2. A photovoltaic crucible mold release compound and photovoltaic crucible mold of claim 1, wherein the binder is ethanol.

3. A photovoltaic crucible mold release compound and photovoltaic crucible mold of claim 1, wherein the binder is water.

4. A photovoltaic crucible mold release compound and photovoltaic crucible mold of claim 1, wherein the binder is an alcohol.

5. A photovoltaic crucible mold release compound and photovoltaic crucible mold comprising: a powder mixture comprising silicon nitride powder having 1 ppm impurities or less; and silicon dioxide 1 ppm impurities or less mixed in with the silicon nitride powder until a gray of the silicon nitride powder turns lighter in color which is from 1% silicon dioxide in weight up to 50% silicon dioxide in weight; a binder comprising a liquid, wherein the powder mixture is mixed with the binder, and wherein the mold release compound is sintered to an inside surface of the photovoltaic crucible mold by laser.

6. A photovoltaic crucible mold release compound and photovoltaic crucible mold of claim 5, wherein the binder is ethanol.

7. A photovoltaic crucible mold release compound and photovoltaic crucible mold of claim 5, wherein the binder is water.

8. A photovoltaic crucible mold release compound and photovoltaic crucible mold of claim 5, wherein the binder is an alcohol.

* * * * *